Patented June 14, 1932

1,862,702

UNITED STATES PATENT OFFICE

GEORGE L. OSWALT, OF FOREST PARK, ILLINOIS

INSULATING BUILDING MATERIAL

No Drawing.    Application filed February 11, 1929. Serial No. 339,274.

My invention relates to building material, and more particularly to a building material employing coal cinders as a base with cement as a binder. Coal cinders have been used in combination with various other substances and in various combinations with cement to form building material.

My invention, however, concerns itself with the production of a material from the coal cinders which may be made to have the required amount of compressive strength suitable to the purpose for which it is to be used and at the same time have an insulating value which is the maximum for its compressive strength.

My invention also contemplates a novel method of making the building material from coal cinders and cement.

Coal cinders, as they come in the original mass, may range in sizes from fine dust or ash to three or four inches in thickness and possibly larger. This original mass has been used in combination with cement after crushing the larger pieces down to a suitable size for use. In such a mixture, however, it is usually found that the fine particles and dust predominate so that, although the material when mixed with cement has a fairly good compressive strength and present a relatively smooth exterior, it is low in heat insulating properties.

The effective heat insulating property of the building material may be increased, I have found, by causing more air spaces or voids in the material in its final cast form. In order to take advantage of this, I propose to so treat the cinders as to retain the maximum amount of voids or air spaces within the cast material for a certain compressive strength, as the insulating effect depends directly upon the amount of air spaces that may be retained within the material.

To carry out this purpose of my invention, I take the coal cinders from the furnace and remove therefrom by screen substantially all the fine cinders, ash, and dust so that the sizes remaining are in the main above a certain minimum size which I have found need not be below one sixteenth (1/16) of an inch. It is, of course, impossible to remove all of the fine dust from the cinders, but I find that a small amount thereof is not objectionable for my purpose. The cinders are also graded by crushing and screening into a plurality of sizes, preferably of two groups, that is: a larger group ranging in sizes from about five sixteenths (5/16) of an inch to one inch or less, and a group of smaller cinders ranging in sizes from one sixteenth (1/16) of an inch or larger to five sixteenths (5/16) of an inch in size. These two groups of sizes are then maintained separated until it is desired to use them when they can be mixed in the proper proportions for the particular job on which they are to be used. Having the fine material removed, of course, decreases the weight of the cinders which makes it possible to make a lighter building material.

Now, in forming the building material, I preferably mix the fine group of cinders with the coarse group in such proportions that the coarse group will predominate by volume, and this proportion may be made larger or smaller depending upon the purpose for which the material is to be used. The mixture is then mixed in with cement of any suitable proportion to form a good binder, and water is added as needed, and the material thereafter molded in whatever form it is to be used whether blocks or walls or other forms. As the amount of coarser cinders is increased relative to the amount of the finer group, a greater number of air spaces or voids is formed in the material after it is cast; and this of course increases the insulating effect of the material up to a certain point and then after that a conducting path made for air may be formed through the material which would destroy the insulating value. If too much large material is used, the compressive strength of the final structure is of course reduced; so the mixture must be varied so as to maintain a compressive strength sufficient for the purpose for which the material is used, and in this manner the maximum insulating effect may be maintained for any desired compressive strength of material. By adding fine materials, I can also increase the insulating value while at the same time weight is added. Thus I have obtained a high insulating value by using all small sizes varying from one sixteenth (1/16) to four sixteenths (4/16) of an inch, but lost considerable strength of the block in so doing.

I find that building blocks of this material have a much better insulating effect than those constructed of the entire mass of cinders, and also that the weight of the block is less; although, of course, if the insulating effect is increased by using a larger amount of the coarse cinders, the compressive strength of the block will be correspondingly reduced. For certain size of unit, it may be necessary to vary the aggregate size of cinders. That is to say, in laying a thin wall, the largest size of cinders might have to be made not greater than one-half (½) inch, and this would also be true for blocks.

However, if the size of the larger cinders is to be reduced, the size of the small groups of cinders should be reduced proportionally.

As a specific example of a method I use and the resulting material, I have separated the cinders by means of a pair of screens into a coarse size ranging from five sixteenths (5/16) to three-fourths (¾) of an inch, crushing all of the larger material until it would pass through a screen having a three-fourths (¾) inch mesh; and I have separated the small cinders from the fine dust in the second screen down to a size from one sixteenth (1/16) of an inch and slightly smaller to five sixteenths (5/16). If the separation of the fine dust is not done while the cinders are dry when they come from the ash pits, it may be necessary to dry the final group before the fine material and dust can be removed.

Having these two sizes of cinders, I mix them in the following proportions: three parts of the fine cinders, and four parts of the coarse cinders, with one or more parts of Portland cement to give the desired strength. The above portions are by volume, and the ingredients are then mixed together dry after which water is added in sufficient quantity to make the mixture plastic and to get the best result in molding. The plastic mixture is then molded and cured in the unit or size desired.

From the above description, it is thought that the details and advantages of my invention will be clear to those skilled in this art. It is obvious, of course, that modifications may be made from the exact proportions and sizes given without departing from the scope of the invention.

Having thus described my invention, what I claim as new and desire to secure by Letters Patent is:

As a building material uniting a maximum of compressive strength and a maximum of heat-insulating value, formed concrete composed of an aggregate of coal cinders of two orders of size, the fragments in one order of size ranging between 1/16 to 5/16 of an inch in diameter and the fragments of the other order of size being between 5/16 and 1 inch in diameter, and a matrix of set cement, the fragments of the larger order of size being approximately four parts in volume to three parts of the fragments of the lower order of size.

In witness whereof, I hereunto subscribe my name this 15th day of January, A. D. 1929.

GEORGE L. OSWALT.